Jan. 12, 1965  L. D. STOUGHTON ETAL  3,165,422
CERAMIC COATED FUEL PARTICLES
Filed March 16, 1961

INVENTORS.
LINCOLN D. STOUGHTON
JOHN M. BLOCHER, JR.
NEIL D. VEIGEL
BY

United States Patent Office 3,165,422
Patented Jan. 12, 1965

3,165,422
CERAMIC COATED FUEL PARTICLES
Lincoln D. Stoughton, Chatham, N.J., and John M. Blocher, Jr., and Neil D. Veigel, Columbus, Ohio, assignors to the United States of America as represented by the United States Atomic Energy Commission
Filed Mar. 16, 1961, Ser. No. 96,338
4 Claims. (Cl. 117—100)

This invention relates to ceramic coated fissionable fuel particles and in particular to ceramic coated fissionable fuel particles in which a fission product sump inter-layer is provided.

The dispersion of fissionable fuel particles in a matrix offers a promising solution to several high-temperature fuel element problems provided some way of controlling fission-product release, corrosion, and fuel migration can be found. A matrix of this type would be suitable for example as the spherical fuel elements in a pebble bed gas-cooled reactor such as described in patent application, S.N. 767,242, filed October 14, 1958, in the names of Robinson and Stoughton, now Patent No. 3,034,689, issued May 15, 1962. The core of such a helium-cooled reactor consists of a bed of fueled-graphite spheres. The use of surface coatings for the spheres themselves, rather than coating for the individual particles has been investigated, and while such an arrangement does have advantages, there are certain disadvantages such as the heavy fission product release which would occur should a coating rupture as compared to the coating on a single particle, and further the greater risk of such ruptures since the outside coatings are themselves without surface protection as are the particle coatings surrounded by matrix.

As a result, it has become apparent that individually coated fission fuel particles, such as $UO_2$ coated with $Al_2O_3$, would have certain distinct advantages over the spherical outer coatings provided some way could be found to provide highly impervious particle coatings capable of uniform application and avoiding the excess stresses which can be expected to result because of fission product accumulation within the tight coating without provision for absorbing such products and thereby relieving such stresses. In such a tightly fitting impermeable coating, certain of the fission products which are found in the $UO_2$ particle are gaseous (i.e., such as xenon, krypton, etc.) and with little free volume inside the particle coating into which these gases could expand gas pressure build-up which could rupture the coatings will limit the useful life of the coated fuel particle. According to some calculations made for this purpose, it has been found that for a $UO_2$ particle of 95% theoretical density, for 50% release of all gaseous fission products from the $UO_2$ crystals in a fuel element exposed to 6000 kwh. irradiation, and assuming that the only volume available to store the fission gases is the pore volume of the $UO_2$, the gas pressure would be about 23,500 p.s.i.

This invention concerns the method of forming coated particles and spherical fuel elements so as to provide the high degree of imperviousness and reliabiilty required for the utility hereinbefore described. In this invention, the coating is applied to form a porous inter-layer in contact with the fissionable material and the impervious outer-layer for containing all fission products. The porous inner layer produces several particular advantages. The pore volume of the porous inner layer will act as a reservoir for fission product gases and increase the useful life of the coated fuel particle. Further, if the porous inner layer is thicker than the recoil range of fission fragments in the coating material, then the outermost impermeable coating will not be damaged by having to absorb the kinetic energy of fission fragments recoiling from the surface of the $UO_2$ particle. Another advantage lies in reducing the critical effect of any differences in coefficients of thermal expansion of the coating and particle material which may exist. For example, a higher coefficient for the fuel particle could result in rupture of the coating when the particle is heated above its fabrication temperature. The porous inner layer could absorb the differences in thermal expansion, which would otherwise crack a tight dense coating applied directly to the fuel particle, thus permitting a higher operating temperature for the coated particle. Still another advantage is that fission product diffusion rates from the coated particle is reduced by presence of the porous inner layer thicker than the fission fragment recoil length since no fission fragments will come to rest in the outermost impermeable layer of the coating. Work on other materials which are normally impermeable to fission products (i.e., metals) has shown that when fission fragments recoil directly into the material, they diffuse through the material at a much faster rate than fission products which come to rest before entering the material. Thus, the porous inner layer will prevent fission products entering the coating directly by recoil and thereby reduce the diffusion rate of fission products from the coated fuel particle. Another and perhaps the most important advantage of the porous inner layer is in effect the provision of a frangible layer which may be crushed under the impact of the expanding $UO_2$ which swells under radiation thereby reducing the stresses which would be imposed on the outer layer by the swelling of the $UO_2$ in the absence of the porous inner layer.

A known method of depositing dense impermeable tightly inherent ceramic $Al_2O_3$ coatings on small $UO_2$ particles is to do this in a fluidized bed wherein aluminum chloride is hydrolyzed in the presence of hydrogen at 1000° C. in such a manner that alpha-phase $Al_2O_3$ is formed. In accordance with this invention, this technique is modified to obtain the porous inner layer, including the initial reduction which is conducted at a somewhat lower temperature to form the porous layer of the $Al_2O_3$.

It is thus a first object of this invention to provide a method of producing a ceramic coated particle of fissionable fuel with a fission sump frangible inner layer.

It is a further object to provide a $UO_2$ particle with a ceramic coating and a porous ceramic layer in between to act as a sump for gaseous fission products.

It is still another object to provide fission fuel material consisting of a matrix containing dispersed $UO_2$ particles each provided with an impervious ceramic coating to contain fission products and a porous inner layer for each particle to act as a reservoir for fission product gases.

Other objects and advantages of this invention will hereinafter become more apparent from the following discussion and with reference to the drawings in which.

It has been found that for use in a nuclear reactor, such as the pebble bed reactor noted above, fuel elements consisting of a carbon or graphite matrix with a dispersion of $UO_2$ particles individually coated with a tight impermeable ceramic coating such as $Al_2O_3$ afforded many advantages previously enumerated. The fluidized bed process of preparing these coated particles had been developed and it was thus made possible to prepare such particles in large numbers with very uniform and excellent results. Further, this technique, using chemical vapor deposition, which is defined as the formation of a solid deposit by chemical reaction of vapors at the heated surface, was ideally suitable since dense coatings could be produced which could be expected to provide good fission-product retention and prevent contact between fuel and corrosive environments.

However, in addition to the other drawbacks which presented itself in the preparation and use of this type of coated fuel particle was that the coefficient of expansion of $UO_2$ is somewhat greater than that of $Al_2O_3$. As a result, the tight impermeable coating would be placed in tension as the particles are heated above the coating-deposition temperature. These stresses are intensified by swelling of the $UO_2$ after undergoing radiation and by the containment within the tight coating of fission product gases released by the $UO_2$.

Figure 1:
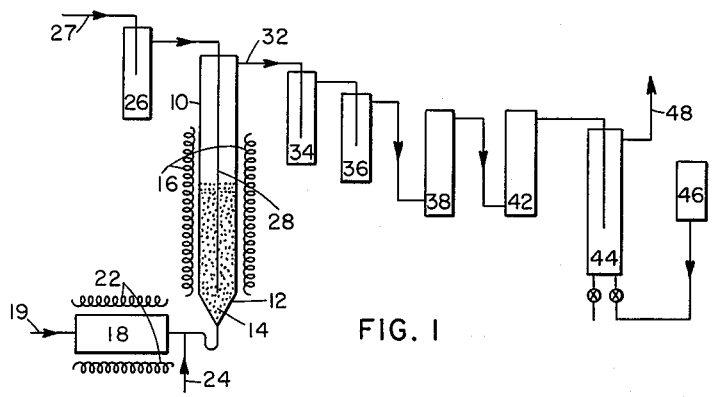
FIG. 1 is a schematic diagram of apparatus for producing $Al_2O_3$ coated $UO_2$ particles in accordance with this invention.
Figure 2:
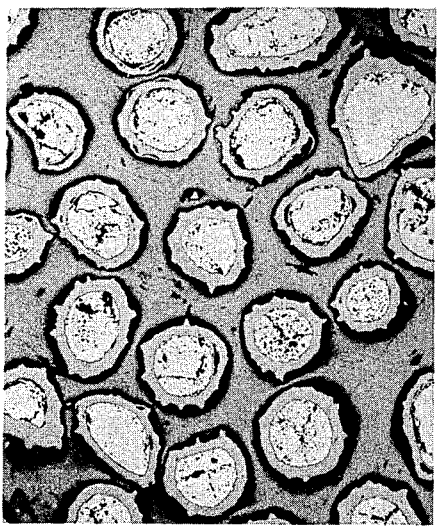
FIG. 2 is a photomicrograph of a typical graphite matrix of spherical $UO_2$ with 20 micron coatings of $Al_2O_3$ at 100×.
Figure 3:
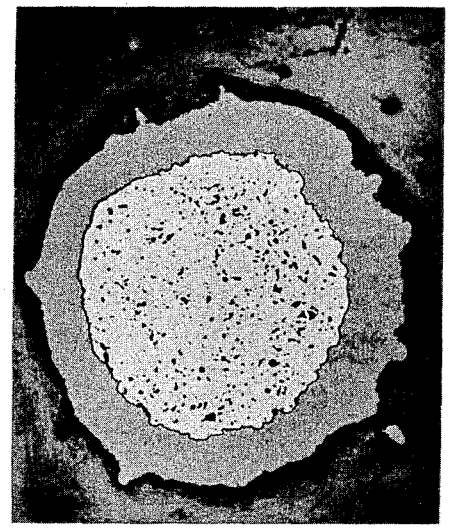
FIG. 3 is a photomicrograph of a $UO_2$ particle in FIG. 2 at 500× with a 20 micron coating of $Al_2O_3$ all alpha phase.

Referring to FIG. 1, for a brief description of the apparatus for the deposition of $Al_2O_3$ on $UO_2$ particles, there is shown a reactor 10 comprising a quartz tube with a conical bottom 12 to support the bed of $UO_2$ powder 14. Reactor 10 is maintained at proper temperature by electrical resistance heating elements 16. Fluidizing gas is supplied to reactor 10 at the bottom from an $AlCl_3$ vaporizer 18 which is heated by electrical resistance elements 22. Hydrogen is supplied to vaporizer 18 from line 19 to become partially saturated with aluminum chloride, with additional hydrogen added from line 24 as needed. A separate stream of hydrogen may be passed through a water vaporizer 26 from line 27 and through an axial tube 28 which terminates in the lower part of fluidized bed 14 where mixing of the reactants occurs at the desired temperature. The gaseous results of the reaction leave reactor 10 at the top through pipe 32 and pass through successive dust traps 34 and 36, filters 38 and 42, and a scrubber 44 which is supplied with water from a reservoir 46. The remaining gases are vented to atmosphere through a pipe 48. In FIGS. 2 and 3 photomicrographs illustrate typical $Al_2O_3$ coated particles previously produced by this technique.

In operating the apparatus of FIG. 1 to obtain the porous inner layer described above, the reaction is maintained at 200 to about 900° C. in the lower part of the bed where the mixing of the reactants occurs for sufficient time for the porous coating to reach desired thickness and then the temperature is raised to from about 900° to 1400° to continue the reaction with the production of the alpha phase $Al_2O_3$. Particles in the range of 50 to 400 micron size were found to be suitable for carrying out this invention.

In carrying out this vapor deposition process as described above, the particles in the fluidized bed circulate from the top of the bed to the bottom. Since the particles in the bottom of the bed are cooled somewhat by the incoming gas, a truly isothermal reactor in connection with carrying out the inventive process especially but not only in the first and lower temperature of the process is not desirable. Thus, temperature cycling of the reactor within the ranges set forth above produce very desirable uniform high quality coatings in both the inner and outer layers in accordance with this invention.

The chemical reaction occurring in reactor 10 is as follows:

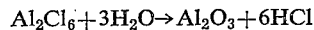

$$Al_2Cl_6 + 3H_2O \rightarrow Al_2O_3 + 6HCl$$

In one example of this invention, a batch of 100 to 150μ $UO_2$ powder was coated in fluidized bed 14 with 20 micron coatings of $Al_2O_3$. The reaction was carried out as described above, with hydrogen, partially saturated with aluminum chloride, constituting the major portion of the fluidizing gas. A 100-g. bed of the $UO_2$ powder was placed in the 1 inch diameter reactor 10. The reaction was conducted at 750° C. for 6 hours to build up the porous layer of the $Al_2O_3$ on the particles and then reactor 10 was vented and the temperature raised to 1000° C. where the reaction was continued for 12 hours to deposite the impermeable alpha phase $Al_2O_3$.

Figure 4:
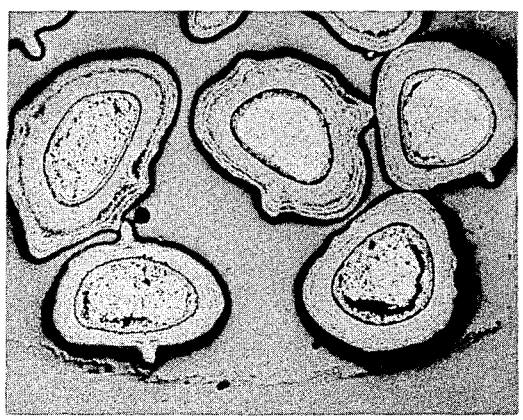
FIG. 4 is a photomicrograph of $UO_2$ particles at 50× with an outer coating of impervious $Al_2O_3$ and a porous inner layer of $Al_2O_3$.

In FIG. 4 a coated $UO_2$ particle with a porous inner layer is shown. The alpha phase $Al_2O_3$ in the outer layer is shown to be very dense. The inner layer is porous and thus not as dense as the outer layer.

Reactor 10 would be limited to a 5 inch diameter when fully enriched $UO_2$ powder is used to avoid criticality problems. However, for less than fully enriched powder, large reactors may be used.

The coated $UO_2$ particles would then be distributed by known techniques in a graphite matrix formed into spherical elements and then, if desired, used in a pebble bed reactor.

Tests on coated $UO_2$ particles provided with the porous $Al_2O_3$ sump show a sharp extension in their life during exposure to intense radioactivity. Particles of this type showed remarkable resistance to thermal stresses imposed by large temperature cycling and certain impact tests.

It is thus seen that there has been provided a method for producing improved $UO_2$ coated particles for preventing release of gaseous fission products and an improved fuel assembly based on such coated particles.

We claim:
1. A method of coating particles of $UO_2$ with a first layer of porous $Al_2O_3$ and a second, outer layer of impermeable, alpha phase $Al_2O_3$, comprising the steps of hydrolizing aluminum chloride in the presence of hydrogen and water vapor in a reactor containing a fluidized bed of $UO_2$ particles at a temperature below 900° C. sufficient to vapor deposit a layer of porous $Al_2O_3$ on the surfaces of said particles, venting said reactor to terminate said porous layer and then resuming the aforementioned hydrolizing step at a temperature above 900° C. sufficient to vapor deposit over said layer of porous $Al_2O_3$ a layer of dense alpha phase $Al_2O_3$.

2. The method of claim 1 in which the porous layer is deposited at a temperature in the range 200 to below 900° C. and the dense layer is deposited at a temperature in the range above 900 to 1400° C.

3. The method of claim 2 in which the $UO_2$ particles are of 50 to 400 micron size.

4. The method of claim 1 in which the porous layer is deposited at about 750° C. and the dense layer is deposited at about 1000° C.

References Cited by the Examiner

UNITED STATES PATENTS

| | | | |
|---|---|---|---|
| 2,782,158 | 2/57 | Wheeler | 204—193.2 |
| 2,853,401 | 9/58 | Mackiw et al. | 117—100 |
| 2,917,406 | 12/59 | McBride | 117—100 |
| 2,920,025 | 1/60 | Anderson | 204—193.2 |

OTHER REFERENCES

Battelle Memorial Inst., BMI-1468, Sept. 16, 1960, pp. 1-9 and 14 relied on.

Browning et al.: BMI-1471, Oct. 25, 1960, pp. 5, 6, 8, and 9 relied on.

Dayton et al.: BMI-1473, Nov. 1, 1960, p. L-3 relied on.

Dayton et al.: BMI-1423, Mar. 1, 1960, p. 70 relied on.

Dayton et al.: BMI-1496, Feb. 1, 1961, pp. L-2 and L-3 relied on.

Dayton et al.: BMI-1504 (Del.), Mar. 1, 1961, pp. L-2 and L-3 relied on.

RICHARD D. NEVIUS, *Primary Examiner*.

O. R. VERTIZ, *Examiner*.